Feb. 15, 1927.
W. F. HENDERSON
STUFFER HORN
Filed May 15, 1926
1,617,848
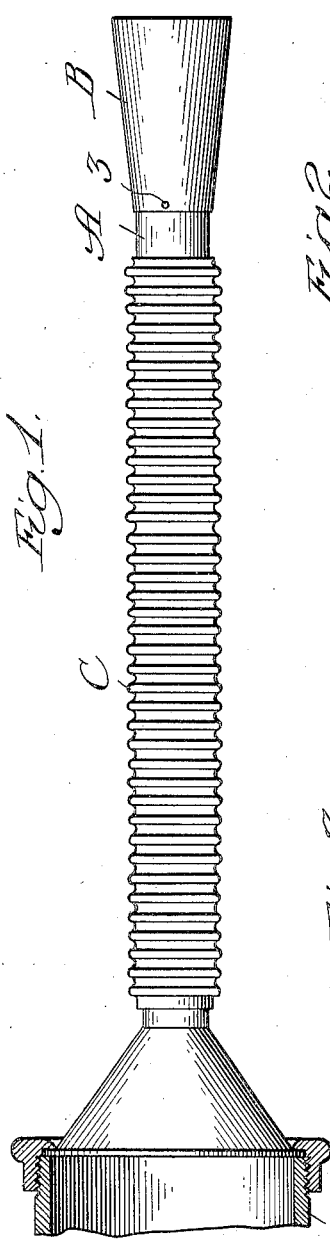
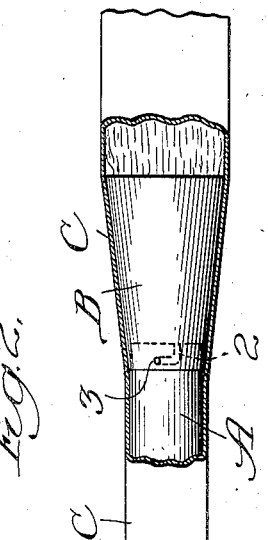
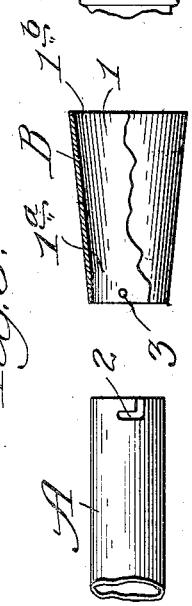
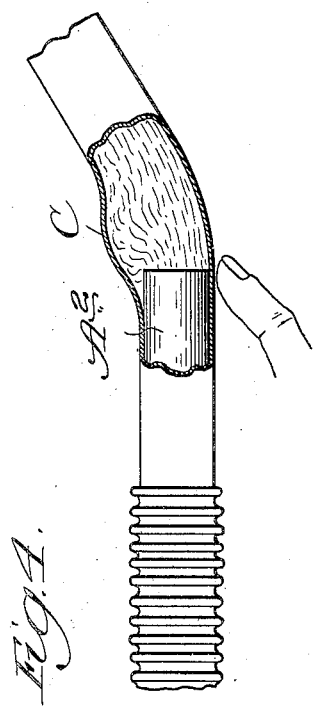
Inventor:
William F. Henderson,
By Dyrenforth, Lee, Chritton & Wiles
Attys Patented Feb. 15, 1927.

1,617,848

UNITED STATES PATENT OFFICE.

WILLIAM F. HENDERSON, OF CHICAGO, ILLINOIS, ASSIGNOR TO THE VISKING CORPORATION, OF CHICAGO, ILLINOIS, A CORPORATION OF VIRGINIA.

STUFFER HORN.

Application filed May 15, 1926. Serial No. 109,301.

This invention relates particularly to the stuffing of sausages, including wieners, etc., and comprises improved means for facilitating the stuffing operation.

In the practice of stuffing sausages, including wieners, etc., the casing is shirred on the stuffer horn and is drawn off by the meat, or stuffing material, as it issues from the horn. In order to insure filling of the casing with meat, the operator retards the casing by pressing it with his fingers at the tip of the horn. Because of the semi-fluid condition of the meat filler, there is a tendency for the filler to back up onto the horn a short distance. Such a result causes little or no difficulty when an ordinary intestinal casing is being stuffed. However, where artificial casings, such as casings composed of cellulose, or cellulose hydrate, are employed, such casings preferably are in a substantially dry condition, although they may contain a slight amount of moisture, just sufficient to give desirable pliability and softness. When such a casing is employed, it will slip readily from the metal horn, provided the meat is not allowed to back up onto the metal horn. This applies also to certain processed intestinal casings which are so treated as to enable them to be used in a substantially dry condition.

The primary object of the present invention is to provide a horn with means for expanding the casing as it passes from the horn and permitting the issuing stream of meat to expand to approximately the diameter of the expanded casing before the meat leaves the tip of the horn.

The invention is illustrated in its preferred embodiment in the accompanying drawing, in which—

Fig. 1 shows the stuffing horn of a sausage-stuffing machine, the sausage-casing being shown in shirred condition on the horn, the horn being equipped with a casing-expander in accordance with the present invention; Fig. 2, a broken view illustrating the stuffing operation, the sausage-casing being partially broken away; Fig. 3, a detail view illustrating the detachable feature of the casing-expander which is preferably employed; and Fig. 4, a broken view similar to Fig. 2, illustrating the manner in which the meat may flow back upon the tip of the horn when the usual practice is followed.

Referring to Figs. 1-3, A designates a stuffer horn mounted on a spout A' of a stuffing machine; B designates a detachable casing-expander mounted on the free end portion of the horn A and virtually constituting the extension of the horn; and C designates the sausage-casing.

The horn A is of metal and usually is of substantially uniform diameter, although it may taper somewhat, if desired.

The casing-expander B is a hollow frusto-conical member having a bore 1 which tapers or expands from its small inner end $1^a$ to the larger outer end $1^b$. The bore at the inner end of the expander is approximately the same as the bore at the outer end of the horn A. It is preferred to make the expander-tip B detachable; and, for this purpose, the inner end of the member B is made large enough to fit snugly over the free end of the horn A. Any suitable means for detachably connecting the expander-tip with the horn may be employed. In the illustration given, the extremity of the horn is provided with bayonet slots 2 (one shown), adapted to be engaged by short studs 3 which project inwardly from the small end of the expander-tip B.

In practice, the casing C is shirred onto the horn A, and the expander-tip B is then attached to the horn. In the stuffing operation, the casing C is drawn outwardly over the expander-tip, and the meat is then extruded through the horn and expander-tip into the casing, the casing being gradually drawn off the horn and over the expander-tip as the extruding operation continues. During the stuffing operation, there is sufficient back pressure to cause the meat to fill the casing-expander. That is, the issuing stream of meat expands within the member B until it becomes of a cross-section corresponding approximately with the cross-section of the expanded casing.

It is preferred to have the large end of the casing-expander B only slightly less than the diameter of the casing in its stuffed condition. The casing in its expanded condition may be slightly larger than the large end of the member B, say one-thirty-second of an inch larger, so that the casing will slip freely over the expander. On the other hand, the stream of meat in semi-fluid condition expands gradually in passing through the member B, and by the time the meat issues from the member B, it is all moving substantially in the direction of the axis of the casing. Hence, there is not the same tendency for the meat to crowd back upon the horn as occurs under the known practice.

In Fig. 4, A² designates a horn of the old type. Necessarily the horn is made considerably smaller than the casing C to enable the casing to be shirred upon the horn. Accordingly, as the meat issues from the horn, it must expand rather abruptly, and thus the tendency is for the meat to crowd back over the tip of the horn. Where artificial casings, or casings treated in such manner as to enable them to be used in substantially dry condition, are employed, the result illustrated in Fig. 4 leads to great difficulty in properly filling the casing. This difficulty is overcome by the use of the casing-expanding device illustrated, this device serving also to permit the gradual expansion of the issuing stream of meat.

It is preferred to make the expander B of such proportions that the length of the expander will be at least twice as great as the small diameter of the expander.

In the illustration given, the expander is shown detachable. This is the preferred embodiment; and where no other provision for slipping the casing onto the stuffer horn than slipping it over the free extremity of the horn is provided, it practically is necessary to have the expander detachable.

It will be understood therefore that the feature of detachability of the expander is important only as it facilitates the loading of the horn with the casing by slipping the casing over the free end of the horn. So far as the stuffing operation is concerned, the horn with the expander thereon may be regarded as a tube having a flaring extremity which serves to expand the casing and permit expansion of the issuing stream of meat before the meat leaves the confining walls of the enlarged tip.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. A stuffer horn comprising a tubular member having a casing-expanding tip provided with an outwardly enlarging bore through which the meat is extruded.

2. In combination with a stuffer horn, a frusto-conical casing-expander at the free end thereof having an outwardly enlarging taper bore.

3. In combination with a stuffer horn, a detachable casing-expander mounted on the free end of said horn and having an outwardly flaring bore through which the stuffing material issues.

4. In combination with a stuffer horn, a detachable frusto-conical casing-expander mounted on the free end of said horn and having an outwardly flaring taper bore whose inner end is of approximately the diameter of the free end of the stuffer horn.

5. An expander-tip for a stuffer horn comprising a hollow open-ended frusto-conical member having a taper bore and equipped at its small end with means for attaching the tip to the free end of the horn.

WILLIAM F. HENDERSON.